United States Patent [19]
Enami et al.

[11] Patent Number: 6,001,943
[45] Date of Patent: Dec. 14, 1999

[54] SILICONE GEL COMPOSITION AND SILICONE GEL FOR USE IN SEALING AND FILLING OF ELECTRICAL AND ELECTRONIC PARTS

[75] Inventors: Hiroji Enami; Yuji Hamada; Akihiro Nakamura; Takeaki Saiki, all of Chiba Prefecture, Japan

[73] Assignee: Dow Corning Toray Silicone Co., Ltd., Tokyo, Japan

[21] Appl. No.: 09/014,557

[22] Filed: Jan. 28, 1998

[30] Foreign Application Priority Data

Jan. 30, 1997 [JP] Japan ................................. 9-031143

[51] Int. Cl.$^6$ .................................................. C08G 77/08
[52] U.S. Cl. ................................ 528/15; 528/31; 528/32; 427/387
[58] Field of Search ................................. 528/15, 31, 32; 427/387

[56] References Cited

U.S. PATENT DOCUMENTS

| | | | |
|---|---|---|---|
| 4,340,709 | 7/1982 | Jeram et al. | 528/15 |
| 4,374,967 | 2/1983 | Brown et al. | . |
| 5,332,795 | 7/1994 | Fujiki et al. | 528/15 |
| 5,548,038 | 8/1996 | Enami et al. | 525/478 |
| 5,571,853 | 11/1996 | Ikeno et al. | 524/268 |
| 5,599,894 | 2/1997 | Ikeno | 528/15 |

FOREIGN PATENT DOCUMENTS

| | | |
|---|---|---|
| 48-17847 | 3/1973 | Japan . |
| 61-48945 | 3/1986 | Japan . |
| 62-104145 | 5/1987 | Japan . |
| 62-181357 | 8/1987 | Japan . |
| 9-204259 | 8/1997 | Japan . |

*Primary Examiner*—Melvyn I. Marquis
*Assistant Examiner*—Mark W. Milstead
*Attorney, Agent, or Firm*—Larry A. Milco

[57] ABSTRACT

The present invention provides a silicone gel composition for use in sealing and filling of electrical and electronic parts, which are characterized by the fact that when said composition is cured, said composition forms a silicone gel in which the loss elastic modulus at a temperature of 25° C. and a shear frequency of 0.1 Hz is $1.0 \times 10^2$ to $1.0 \times 10^4$ Pa, and in which the complex elastic modulus is $1.0 \times 10^5$ Pa or less, and a silicone gel which is characterized by the fact that in a silicone gel which seals or fills electrical or electronic parts, the loss elastic modulus of this silicone gel at a temperature of 25° C. and a shear frequency of 0.1 Hz is $1.0 \times 10^2$ to $1.0 \times 10^4$ Pa, and the complex elastic modulus is $1.0 \times 10^5$ Pa or less.

26 Claims, No Drawings

SILICONE GEL COMPOSITION AND SILICONE GEL FOR USE IN SEALING AND FILLING OF ELECTRICAL AND ELECTRONIC PARTS

FIELD OF THE INVENTION

The present invention concerns a silicone gel composition and silicone gel for use in the sealing and filling of electrical and electronic parts. More specifically, the present invention concerns a silicone gel composition for use in the sealing and filling of electrical and electronic parts in which the formation of gas bubbles and cracks in the silicone gel sealing or filling the electrical or electronic parts is suppressed, and a silicone gel which seals or fills electrical or electronic parts, and in which the formation of gas bubbles and cracks is suppressed.

BACKGROUND OF THE INVENTION

When cured, silicone gel compositions can form silicone gels which have good stress-relieving characteristics, electrical characteristics, heat resistance and weather resistance. Accordingly, such silicone gel compositions are widely used as sealing agents and filling agents in electrical and electronic parts (see Japanese Patent Application Kokai No. 9-204259, Japanese Patent Application Kokai No. 61-48945, and Japanese Patent Application Kokai No. 62-104145). Furthermore, examples of such silicone gel compositions include silicone gel compositions which consist of a vinyl-group-containing organopolysiloxane which has a branched structure and which has a viscosity of 10 to 10,000 centistokes at 25° C., a linear organopolysiloxane which contains hydrogen atoms bonded to silicon atoms, and a hydrosilylation reaction catalyst (see Japanese Patent Application Kokai No. 48-17847); silicone gel compositions which consist of a vinyl-group-containing organopolysiloxane which has a branched structure, an organopolysiloxane which contains hydrogen atoms bonded to silicon atoms, and a hydrosilylation reaction catalyst (see Japanese Patent Application Kokai No. 58-7452); and silicone gel compositions which consist of a vinyl-group-containing organopolysiloxane which has a branched structure and which has a viscosity of 20 to 10,000 centistokes at 25° C., a linear organopolysiloxane in which both ends of the molecular chains are closed by vinyl groups, a linear organopolysiloxane which contains hydrogen atoms bonded to silicon atoms only at both ends of the molecular chains, and a hydrosilylation reaction catalyst (see Japanese Patent Application Kokoku No. 3-19269).

However, when electrical or electronic parts which have a complicated structure are sealed or filled by means of such silicone gel compositions, gas bubbles and cracks are formed in the sealing silicone gel as a result of the heat cycle, so that the reliability of the electrical or electronic parts drops. Furthermore, it has been found that the formation of gas bubbles and cracks in silicone gels sealing or filling such electrical or electronic parts is conspicuous in the case of electrical or electronic parts in which there are narrow gaps between adjacent electrodes, adjacent electrical elements or electrical elements and packages, etc., and electrical or electronic parts in which it is difficult for such structures to conform to the expansion or contraction of the silicone gel.

SUMMARY OF THE INVENTION

The silicone gel composition of the present invention for use in the sealing and filling of electrical and electronic parts is characterized by the fact that when said composition is cured, said composition forms a silicone gel in which the loss elastic modulus at a temperature of 25° C. and a shear frequency of 0.1 Hz is $1.0 \times 10^2$ to $1.0 \times 10^4$ Pa, and in which the complex elastic modulus is $1.0 \times 10^5$ Pa or less.

Furthermore, the silicone gel of the present invention seals or fills electrical or electronic parts, and is characterized by the fact that the loss elastic modulus of this silicone gel at a temperature of 25° C. and a shear frequency of 0.1 Hz is $1.0 \times 10^2$ to $1.0 \times 10^4$ Pa, and by the fact that the complex elastic modulus is $1.0 \times 10^5$ Pa or less.

Specifically, the object of the present invention is to provide a silicone gel composition for use in the sealing and filling of electrical and electronic parts in which the formation of gas bubbles and cracks in the silicone gel sealing or filling the electrical or electronic parts is suppressed, and a silicone gel which seals or fills electrical or electronic parts, and in which the formation of gas bubbles and cracks is suppressed, and thus to provide electrical and electronic parts with superior reliability.

DETAILED DESCRIPTION OF THE INVENTION

First, the silicone gel composition of the present invention for use in the sealing and filling of electrical and electronic parts will be described in detail.

The silicone gel composition of the present invention for use in the sealing and filling of electrical and electronic parts is characterized by the fact that when said composition is cured, said composition forms a silicone gel in which the loss elastic modulus at a temperature of 25° C. and a shear frequency of 0.1 Hz is $1.0 \times 10^2$ to $1.0 \times 10^4$ Pa, and complex elastic modulus is $1.0 \times 10^5$ Pa or less. Preferably, this composition is characterized by the fact that when said composition is cured, said composition forms a silicone gel in which the abovementioned loss elastic modulus is $3.0 \times 10^2$ to $3.0 \times 10^3$ Pa, and in which the complex elastic modulus is $1.0 \times 10^4$ Pa or less. The present invention was devised as a result of the discovery that even when electrical or electronic parts sealed or filled by means of a silicone gel having the abovementioned specified loss elastic modulus and complex elastic modulus are subjected to a heat cycle, the formation of gas bubbles and cracks in the silicone gel is suppressed. There are no restrictions on the electrical or electronic parts which can be sealed or filled by means of the present composition; however, the present composition is especially effective in electrical or electronic parts in which there are narrow gaps between adjacent electrodes, adjacent electrical elements or electrical elements and packages, etc., and electrical or electronic parts in which it is difficult for such structures to conform to the expansion or contraction of the silicone gel. Examples of such electrical and electronic parts include semiconductor elements such as IC's, hybrid IC's and LSI's, etc., and electrical circuits or modules mounting such semiconductor elements along with electrical elements such as capacitors and electrical resistors, etc., e.g., various types of sensors such as pressure sensors, etc., as well as automobile igniters and regulators which are generally sealed or filled by means of a silicone gel. Furthermore, there are no restrictions on the curing mechanism of the present composition; for example, curing mechanisms which may be used include hydrosilylation reaction curing by means of alkenyl groups and hydrogen atoms bonded to silicon atoms, de-alcohol condensation reaction curing by means of silanol groups and alkoxy groups bonded to silicon atoms, and radical reaction curing by means of ultraviolet irradiation. Hydrosilylation reaction curing is especially desirable in that such curing makes it possible to achieve curing of the entire silicone gel relatively quickly. The loss elastic modulus (at a temperature of 25° C. and a shear frequency of 0.1 Hz) and the complex elastic modulus of the silicone gel obtained by curing the present composition can be determined by preparing the silicone gel as a circular plate with a thickness of 5 to 6 mm and a diameter of 20 mm, and then measuring the abovementioned values by means of a dynamic viscoelasticity measuring device. Furthermore, a composition which forms a silicone gel in which the 1/4 consistency as stipulated in JIS K 2220 is 20 to 80 is desirable, since electrical or electronic parts sealed or filled by means of such a silicone gel show conspicuous suppression of gas bubbles and cracks in the silicone gel even when repeatedly subjected to a heat cycle.

A composition comprising (A) an alkenyl group-containing organopolysiloxane which contains at least an alkenyl group-containing organopolysiloxane with a branched structure, and which has a viscosity of 10 to 100,000 centipoise at 25° C.;

(B) a linear organopolysiloxane which contains hydrogen atoms bonded to silicon atoms only at both ends of the molecular chains, and which has a viscosity of 1 to 10,000 centipoise at 25° C., the amount of this component that is mixed with the composition is such that the quantity of hydrogen atoms bonded to silicon atoms contained in this component is 0.2 to 5 moles per mole of alkenyl groups contained in component (A), and (C) a catalytic amount of a hydrosilylation reaction catalyst, is especially desirable as such a hydrosilylation reaction curable silicone gel composition for use in the sealing and filling of electrical and electronic parts.

The alkenyl group-containing organopolysiloxane of component (A) is the main agent of the abovementioned composition, and is characterized by the fact that said organopolysiloxane contains at least an alkenyl group-containing organopolysiloxane with a branched structure, and has a viscosity in the range of 10 to 100,000 centipoise at 25° C. The reasons for this are as follows: i.e., if the abovementioned viscosity is less than the lower limit of the abovementioned range, the physical characteristics of the silicone gel obtained tend to deteriorate; on the other hand, if the viscosity exceeds the upper limit of the abovementioned range, the handling and working characteristics of the silicone gel obtained tend to deteriorate. The abovementioned "alkenyl group-containing organopolysiloxane with a branched structure" refers to an organopolysiloxane whose molecular structure is either branched or linear with some branching; in concrete terms, this refers to an organopolysiloxane which has $RSiO_{3/2}$ units (R indicates a monovalent hydrocarbon group) and/or $SiO_{4/2}$ units in its molecular structure. Such a component (A) may consist entirely of an alkenyl group-containing organopolysiloxane with a branched structure, or may comprise a mixture of such an organopolysiloxane with a linear alkenyl group-containing organopolysiloxane. In the present composition, it is desirable that this component (A) be a mixture of an alkenyl group-containing organopolysiloxane which has a branched structure with a linear alkenyl group-containing organopolysiloxane.

It is desirable that the abovementioned alkenyl group-containing organopolysiloxane which has a branched structure be a polymer comprising $R_2SiO_{2/2}$ units, $RSiO_{3/2}$ units and $R_3SiO_{1/2}$ units. Examples of R in these units include monovalent hydrocarbon groups, e.g., alkyl groups such as methyl groups, ethyl groups and propyl groups, etc.; alkenyl groups such as vinyl groups, allyl groups, butenyl groups and hexenyl groups, etc.; aryl groups such as phenyl groups and tolyl groups, etc.; and halogenated alkyl groups such as 3,3,3-trifluoropropyl groups, etc. The polymer may also contain extremely small amounts of hydroxy groups, as well as alkoxy groups such as methoxy groups, etc. However, at least one R in this polymer must be an alkenyl group. Furthermore, there are no restrictions on the ratio of the abovementioned units; however, in this polymer, it is desirable that the quantity of $R_2SiO_{2/2}$ units be in the range of 80.00 to 99.65 mol %, that the quantity of $RSiO_{3/2}$ units be in the range of 0.10 to 10.00 mol %, and that the remainder of the polymer consist of $R_3SiO_{1/2}$ units.

Furthermore, examples of the abovementioned linear alkenyl group-containing organopolysiloxane include dimethylpolysiloxanes in which both ends of the molecular chains are closed by dimethylvinylsiloxy groups; dimethylsiloxane-methylphenylsiloxane copolymers in which both ends of the molecular chains are closed by dimethylvinylsiloxy groups; dimethylsiloxane-methylvinylsiloxane copolymers in which both ends of the molecular chains are closed by trimethylsiloxy groups; dimethylsiloxane-methylvinylsiloxane-methylphenylsiloxane copolymers in which both ends of the molecular chains are closed by trimethylsiloxy groups; dimethylsiloxane-methylvinylsiloxane copolymers in which both ends of the molecular chains are closed by silanol groups; polymers in which some of the methyl groups in the abovementioned polymers are replaced by alkyl groups other than methyl groups (e.g., ethyl groups or propyl groups, etc.) or by halogenated alkyl groups such as 3,3,3-trifluoropropyl groups, etc.; polymers in which the vinyl groups in the abovementioned polymers are replaced by alkenyl groups other than vinyl groups (e.g., allyl groups, butenyl groups or hexenyl groups, etc.); and mixtures comprising of two or more of the abovementioned polymers. In particular, organopolysiloxanes which have alkenyl groups at both ends of the molecular chains are especially desirable.

There are no restrictions on the ratio of the abovementioned alkenyl group-containing organopolysiloxane with a branched structure and the abovementioned linear organopolysiloxane; however, it is desirable that the amount of the abovementioned alkenyl group-containing organopolysiloxane with a branched structure in component (A) be in the range of 5 to 95 wt %; furthermore, this amount is preferably in the range of 10 to 90 wt %, and is even more preferably in the range of 20 to 80 wt %. The reason for this is as follows: i.e., if the content of the abovementioned alkenyl group-containing organopolysiloxane with a branched structure in component (A) is outside the abovementioned range, it is difficult to satisfy the abovementioned conditions requiring that the loss elastic modulus of the resulting silicone gel at a temperature of 25° C. and a shear frequency of 0.1 Hz be in the range of $1.0 \times 10^2$ to $1.0 \times 10^4$ Pa, and that the complex elastic modulus be $1.0 \times 10^5$ Pa or less. As a result, gas bubbles and cracks tend to form in the silicone gel sealing or filling the abovementioned electrical or electronic parts.

The linear organopolysiloxane of component (B) is the cross-linking agent of the abovementioned composition, and is characterized by the fact that said organopolysiloxane contains hydrogen atoms bonded to silicon atoms only at both ends of the molecular chains, and has a viscosity in the range of 1 to 10,000 centipoise at 25° C. Examples of organic groups which can be bonded to the silicon atoms in this component (B) include monovalent hydrocarbon groups other than alkenyl groups, e.g., alkenyl groups such alkyl groups such as methyl groups, ethyl groups and propyl groups, etc.; aryl groups such as phenyl groups and tolyl groups, etc.; and halogenated alkyl groups such as 3,3,3-trifluoropropyl groups, etc. Furthermore, the viscosity of component (B) at 25° C. is in the range of 1 to 10,000 centipoise. The reasons for this are as follows: specifically, if the abovementioned viscosity is less than the lower limit of the abovementioned range, the physical characteristics of the silicone gel obtained tend to deteriorate; on the other hand, if the viscosity exceeds the upper limit of the abovementioned range, the handling and working characteristics of the silicone gel obtained tend to deteriorate.

In the abovementioned composition, the amount of component (B) that is mixed with the composition is such that the quantity of hydrogen atoms bonded to silicon atoms contained in component (B) is in the range of 0.2 to 5 moles per mole of alkenyl groups contained in component (A). In particular, it is desirable that this amount is such that the abovementioned quantity of hydrogen atoms bonded to silicon atoms is in the range of 0.8 to 1.2 moles. The reasons for this are as follows: i.e., if the number of moles of hydrogen atoms bonded to silicon atoms contained in component (B) per mole of alkenyl groups contained in component (A) is less than the lower limit of the abovementioned range, the silicone gel composition obtained tends not to be sufficiently cured; on the other hand, if said number of moles exceeds the upper limit of the abovementioned range, the physical characteristics of the silicone gel obtained tend to deteriorate.

The hydrosilylation reaction catalyst of component (C) is a catalyst which is used to promote the curing of the abovementioned composition. Examples of catalysts which can be used as this component (C) include platinum type catalysts such as chloroplatinic acid, alcohol solutions of chloroplatinic acid, complexes of platinum and olefins, complexes of platinum and 1,3-divinyl-1,1,3,3-tetramethyldisiloxane, and powders on which platinum is supported, etc.; palladium type catalysts such as tetrakis (triphenylphosphine)palladium, palladium black, and mixtures [of palladium] with triphenylphosphine, etc.; and rhodium type catalysts. In particular, platinum type catalysts are especially desirable.

In the abovementioned composition, the amount of component (C) that is mixed with the composition is a catalytic amount. In cases where a platinum type catalyst is used as component (C), it is desirable from a practical standpoint that the amount of platinum metal of this catalyst that is contained in the abovementioned composition be in the range of 0.01 to 1,000 ppm (in weight units), and an amount in the range of 0.1 to 500 ppm is especially desirable.

Furthermore, for example, hydrosilylation reaction adjusting agents such as acetylene compounds; organophosphorus compounds or vinyl-group-containing siloxane compounds, etc.; inorganic fillers such as fumed silica, wet-process silica, pulverized quartz, titanium oxide, magnesium carbonate, lead oxide, iron oxide, diatomaceous earth or carbon black, etc.; inorganic fillers prepared by subjecting the surfaces of the abovementioned inorganic fillers to a hydrophobic treatment using organo-silicon compounds; and other additives such as flame-retarding additives, heat-resistant additives, pigments or dyes, etc., may also be mixed with the abovementioned composition as optional components.

Furthermore, a composition comprises
(A') an alkenyl group-containing organopolysiloxane which has a viscosity of 10 to 100,000 centipoise at 25° C., (B') an organopolysiloxane which comprises a linear organopolysiloxane containing hydrogen atoms bonded to silicon atoms only at both ends of the molecular chains and a linear organopolysiloxane containing hydrogen atoms bonded to silicon atoms only on the molecular side chains, and which has a viscosity of 1 to 10,000 centipoise at 25° C., the amount of this component that is mixed with the composition is such that the quantity of hydrogen atoms bonded to silicon atoms contained in this component is 0.2 to 5 moles per mole of alkenyl groups contained in component (A'), and (C) a catalytic amount of a hydrosilylation reaction catalyst, is also desirable as such a hydrosilylation reaction curable silicone gel composition for use in the sealing and filling of electrical and electronic parts.

The alkenyl group-containing organopolysiloxane of component (A') is the main agent of the abovementioned composition, and is characterized by the fact that said organopolysiloxane has a viscosity in the range of 10 to 100,000 centipoise at 25° C. The reasons for this are as follows: i.e., if the abovementioned viscosity is less than the lower limit of the abovementioned range, the physical characteristics of the silicone gel obtained tend to deteriorate; on the other hand, if the viscosity exceeds the upper limit of the abovementioned range, the handling and working characteristics of the silicone gel composition obtained tend to deteriorate. Examples of alkenyl groups which may be bonded to the silicon atoms in component (A') include vinyl groups, allyl groups, butenyl groups and hexenyl groups. Preferably, these groups are vinyl groups. Furthermore, examples of groups other than alkenyl groups which may be bonded to the silicon atoms in component (A') include substituted or unsubstituted monovalent hydrocarbon groups, e.g., alkyl groups such as methyl groups, ethyl groups and propyl groups, etc.; aryl groups such as phenyl groups and tolyl groups, etc.; and halogenated alkyl groups such as 3,3,3-trifluoropropyl groups, etc. The polymer may also contain extremely small amounts of hydroxy groups, as well as alkoxy groups such as methoxy groups, etc. There are no restrictions on the molecular structure of this component (A'); for example, component (A') may have a linear structure, a linear structure with some branching, or a branched structure. Preferably, the structure of this component is linear. The same organopolysiloxanes as those described above may be cited as examples of such linear alkenyl group-containing organopolysiloxanes.

The organopolysiloxane of component (B') is the cross-linking agent of the abovementioned composition, and is characterized by the fact that said organopolysiloxane comprises a linear organopolysiloxane containing hydrogen atoms bonded to silicon atoms only at both ends of the molecular chains and a linear organopolysiloxane containing hydrogen atoms bonded to silicon atoms only on the molecular side chains, and has a viscosity of 1 to 10,000 centipoise at 25° C. The reasons for this are as follows: i.e., if the abovementioned viscosity is less than the lower limit of the abovementioned range, the physical characteristics of the silicone gel obtained tend to deteriorate; on the other hand, if the viscosity exceeds the upper limit of the abovementioned range, the handling and working characteristics of the silicone gel composition obtained tend to deteriorate. The same organopolysiloxanes as those described above may be cited as examples of such linear organopolysiloxanes containing hydrogen atoms bonded to silicon atoms only at both ends of the molecular chains. Furthermore, methylhydridopolysiloxanes in which both ends of the molecular chains are closed by trimethylsiloxy groups, dimethylsiloxane-methylhydridosiloxane copolymers in which both ends of the molecular chains are closed by trimethylsiloxy groups, polymers in which some of the methyl groups in the abovementioned polymers are replaced by alkyl groups other than methyl groups (e.g., ethyl groups or propyl groups, etc.) or by phenyl groups or 3,3,3-trifluoropropyl groups, etc., and mixtures comprising two or more or these polymers, may be cited as examples of the abovementioned linear organopolysiloxanes containing hydrogen atoms bonded to silicon atoms only on the molecular side chains.

In component (B'), there are no restrictions on the relative proportions of the abovementioned linear organopolysiloxane containing hydrogen atoms bonded to silicon atoms only at both ends of the molecular chains and the abovementioned linear organopolysiloxane containing hydrogen atoms bonded to silicon atoms only on the molecular side chains; however, it is desirable that the weight ratio of these components be in a range which is such that the weight of the latter organopolysiloxane is 0.1 to 20% of the weight of the former organopolysiloxane. Furthermore, this value is preferably a weight ratio in the range of 1 to 10%, and is even more preferably a weight ratio in the range of 1 to 5%. The reasons for this are as follows: i.e., if the abovementioned weight ratio is less than the lower limit of the abovementioned range, the silicone gel composition obtained tends not to be sufficiently cured; on the other hand, if the abovementioned weight ratio exceeds the upper limit of the abovementioned range, it becomes difficult to satisfy the abovementioned conditions requiring that the loss elastic modulus of the resulting silicone gel at a temperature of 25° C. and a shear frequency of 0.1 Hz be in the range of $1.0 \times 10^2$ to $1.0 \times 10^4$ Pa, and that the complex elastic modulus be $1.0 \times 10^5$ Pa or less. As a result, gas bubbles and cracks tend to form in the silicone gel sealing or filling the abovementioned electrical or electronic parts.

In the abovementioned composition, the amount of component (B') that is mixed with the composition is such that the quantity of hydrogen atoms bonded to silicon atoms contained in component (B') is in the range of 0.2 to 5 moles per mole of alkenyl groups contained in component (A'). In particular, it is desirable that this amount is such that the abovementioned quantity of hydrogen atoms bonded to silicon atoms is in the range of 0.8 to 1.2 moles. The reasons for this are as follows: i.e., if the number of moles of hydrogen atoms bonded to silicon atoms contained in component (B') per mole of alkenyl groups contained in component (A') is less than the lower limit of the abovementioned range, the silicone gel composition obtained tends not be sufficiently cured; on the other hand, if said number of moles exceeds the upper limit of the abovementioned range, the physical characteristics of the silicone gel obtained tend to deteriorate.

The hydrosilylation reaction catalyst of component (C) is a catalyst which is used to promote the curing of the abovementioned composition. Examples of catalysts which can be used as this component (C) are as described above. In the abovementioned composition, the amount of component (C) that is mixed with the composition is a catalytic amount. In cases where a platinum type catalyst is used as component (C), it is desirable from a practical standpoint that the amount of platinum metal of this catalyst that is contained in the abovementioned composition be in the range of 0.01 to 1,000 ppm (in weight units), and an amount in the range of 0.1 to 500 ppm is especially desirable.

Furthermore, for example, hydrosilylation reaction adjusting agents such as acetylene compounds, organo-phosphorus compounds or vinyl-group-containing siloxane compounds, etc., inorganic fillers such as fumed silica, wet-process silica, pulverized quartz, titanium oxide, magnesium carbonate, lead oxide, iron oxide, diatomaceous earth or carbon black, etc., inorganic fillers prepared by subjecting the surfaces of the abovementioned inorganic fillers to a hydrophobic treatment using organo-silicon compounds, and other additives such as flame-retarding additives, heat-resistant additives, pigments or dyes, etc., may also be mixed with the abovementioned composition as optional components.

There are no restrictions on the method used to seal or fill electrical or electronic parts by means of the silicone gel composition of the present invention for use in the sealing and filling of electrical and electronic parts. For example, methods may be used in which the abovementioned composition is cured by heating the composition, allowing the composition to stand at room temperature or irradiating the composition with ultraviolet light, after the abovementioned electrical or electronic parts have been sealed or filled by means of said composition. In particular, a method in which a hydrosilylation reaction curable silicone gel composition is cured by heating following the abovementioned sealing or filling is especially desirable, since such a method makes it possible to cure the entire composition relatively quickly. In this case, if the heating temperature is excessively high, the formation of gas bubbles and cracks in the sealing or filling silicone gel is promoted; accordingly, it is desirable to heat the composition in the range of 50 to 250° C., and heating in the range of 70 to 130° C. is especially desirable.

Next, the silicone gel of the present invention will be described in detail. The silicone gel of the present invention is used to seal or fill electrical or electronic parts, and is characterized by the fact that the loss elastic modulus of this silicone gel at a temperature of 25° C. and a shear frequency of 0.1 Hz is $1.0 \times 10^2$ to $1.0 \times 10^4$ Pa, and by the fact that the complex elastic modulus is $1.0 \times 10^5$ Pa or less. Preferably, this silicone gel is characterized by the fact that the abovementioned loss elastic modulus is $3.0 \times 10^2$ to $3.0 \times 10^3$ Pa, and by the fact that the complex elastic modulus is $1.0 \times 10^4$ Pa or less. The reason for this is as follows: i.e., even when electrical or electronic parts sealed or filled by means of a silicone gel having the abovementioned specified loss elastic modulus and complex elastic modulus are subjected to a heat cycle, the formation of gas bubbles and cracks in the silicone gel is suppressed; accordingly, such a composition makes it possible to improve the reliability of the abovementioned electrical or electronic parts without lowering the electrical characteristics such as the insulation breakdown strength, etc. There are no restrictions on the electrical or electronic parts which can be sealed or filled by means of the present composition; however, the present composition is especially effective in electrical or electronic parts in which there are narrow gaps between adjacent electrodes, adjacent electrical elements or electrical elements and packages, etc., and electrical or electronic parts in which it is difficult for such structures to conform to the expansion or contraction of the silicone gel. Examples of such electrical and electronic parts include semiconductor elements such as IC's, hybrid IC's and LSI's, etc., and electrical circuits or modules mounting such semiconductor elements along with electrical elements such as capacitors and electrical resistors, etc., e.g., various types of sensors such as pressure sensors, etc., as well as automobile igniters and regulators which are generally sealed or filled by means of a silicone gel.

EXAMPLES

The silicone gel composition of the present invention for use in the sealing and filling of electrical and electronic parts will now be described in detail in terms of practical examples of application. Furthermore, the characteristics cited in the practical examples are values that were measured at 25° C.; these silicone gel characteristics were measured as follows:

Loss of Elastic Modulus and Complex Elastic Modulus of Silicone Gel

In each case, a circular plate-form silicone gel sample with a thickness of 5 to 6 mm and a diameter of 20 mm was prepared by heating the silicone gel composition for use in the sealing and filling of electrical and electronic parts for 1 hour at 125° C. The loss elastic modulus and complex elastic modulus of this silicone gel sample at a temperature of 25° C. and a shear frequency of 0.1 Hz were measured by means of a dynamic viscoelasticity measuring device manufactured by Rheometric Co. (commercial name: Dynamic Analyzer ARES).

1/4 Consistency of Silicone Gel

In each case, the silicone gel composition for use in the sealing and filling of electrical and electronic parts was gently poured into a 50 mL glass beaker, and a silicone gel was prepared by heating this composition for 1 hour at 125° C. The 1/4 consistency of the resulting silicone gel was then measured by the method stipulated in JIS K 2220.

Examples 1 Through 7 and Comparative Examples 1 Through 4

The components described below were mixed in the proportions (parts by weight) shown in Table 1, thus producing colorless transparent silicone gel compositions for use in the sealing and filling of electrical and electronic parts. Furthermore, in Table 1, SiH/SiCH=$CH_2$ indicates the number of moles of hydrogen atoms bonded to silicon atoms contained in the abovementioned organopolysiloxane containing hydrogen atoms bonded to silicon atoms, per mole of alkenyl groups contained in the abovementioned organopolysiloxane containing alkenyl groups in each composition.

Component a-1
Organopolysiloxane with a viscosity of 800 centipoise, consisting of 93.50 mol % $(CH_3)_2SiO_{2/2}$ units, 3.30 mol % $CH_3SiO_{3/2}$ units, 2.60 mol % $(CH_3)_3SiO_{1/2}$ units, and 0.60 mol % $(CH_3)_2(CH_2{=}CH)SiO_{1/2}$ units (vinyl group content=0.22 wt %).

Component a-2
Organopolysiloxane with a viscosity of 870 centipoise, consisting of 93.50 mol % $(CH_3)_2SiO_{2/2}$ units, 3.30 mol % $CH_3SiO_{3/2}$ units, 1.60 mol % $(CH_3)_3SiO_{1/2}$ units, and 1.60 mol % $(CH_3)_2(CH_2{=}CH)SiO_{1/2}$ units (vinyl group content=0.58 wt %).

Component a-3
Organopolysiloxane with a viscosity of 280 centipoise, consisting of 93.50 mol % $(CH_3)_2SiO_{2/2}$ units, 0.80 mol % $CH_3SiO_{3/2}$ units, 4.10 mol % $(CH_3)_3SiO_{1/2}$ units, and 1.60 mol % $(CH_3)_2(CH_2{=}CH)SiO_{1/2}$ units (vinyl group content=0.58 wt %).

Component a-4
Organopolysiloxane with a viscosity of 255 centipoise, consisting of 93.50 mol % $(CH_3)_2SiO_{2/2}$ units, 0.80 mol % $CH_3SiO_{3/2}$ units, 5.10 mol % $(CH_3)_3SiO_{1/2}$ units, and 0.60 mol % $(CH_3)_2(CH_2{=}CH)SiO_{1/2}$ units (vinyl group content=0.2 wt %).

Component a-5
Dimethylpolysiloxane with a viscosity of 2,000 centipoise, in which both ends of the molecular chains are closed by dimethylvinylsiloxy groups (vinyl group content=0.23 wt %).

Component a-6
Dimethylpolysiloxane with a viscosity of 360 centipoise, in which both ends of the molecular chains are closed by dimethylvinylsiloxy groups (vinyl group content=0.48 wt %).

Component a-7
Dimethylpolysiloxane with a viscosity of 930 centipoise, in which both ends of the molecular chains are closed by trimethylsiloxy groups, with some of the ends of the molecular chains being closed by dimethylvinylsiloxy groups (vinyl group content=0.11 wt %).

Component b-1
Dimethylpolysiloxane with a viscosity of 16 centipoise, in which both ends of the molecular chains are closed by dimethylhydridosiloxy groups (content of hydrogen atoms bonded to silicon atoms=0.13 wt %).

Component b-2
Dimethylsiloxane-methylhydridosiloxane copolymer with a viscosity of 4 centipoise, in which both ends of the molecular chains are closed by trimethylsiloxy groups (content of hydrogen atoms bonded to silicon atoms=0.78 wt %).

Component c
Complex of platinum and 1,3-divinyl-1,1,3,3-tetramethyl-disiloxane with a platinum concentration of 0.5 wt % (vinyl group content=2.48 wt %).

Electrical/electronic parts for use in evaluation were manufactured using the abovementioned silicone gel compositions for use in the sealing and filling of electrical and electronic parts. Specifically, electrodes with a diameter of 2 mm and a length of 45 mm were gently placed in a glass Petri dish with a diameter of 80 mm and a height of 12 mm so that there was a gap of 1 mm between said electrodes. Furthermore, a glass plate with dimensions of 50 mm×50 mm×1 mm was placed on top of the aforementioned electrodes. In each case, 30 g of a silicone gel composition (for use in the sealing and filling of electrical and electronic parts) prepared using one of the mixture compositions shown in Table 1 was gently poured into the resulting electrical/electronic part. Afterward, the sample together with the Petri dish was vacuum-defoamed for 10 minutes at room temperature and a pressure of 5 mmHg, and was then heated for 1 hour in an oven at 125° C., thus curing the silicone gel composition for use in the sealing and filling of electrical and electronic parts so that a silicone gel was formed. The resulting electrical/electronic part was allowed to stand for 1 week at 25° C., and was then subjected to a heat cycle test in which one cycle consisted of allowing the sample to stand quietly for 24 hours at 50° C. and then for 24 hours at 25° C. Afterward, the presence or absence of gas bubbles and cracks in the silicone gel sealing or filling the electrical/electronic part, and the extent of any such gas bubbles or cracks found, were ascertained. A voltage was applied across the electrodes of the electrical/electronic part at a voltage increase rate of 1 kV/ sec, and the insulation breakdown strength was measured. Furthermore, the presence or absence of gas bubbles and cracks, and the extent of any such gas bubbles or cracks found, were also ascertained for the silicone gel sealing or filling the abovementioned electrical/electronic parts following 5 cycles of the abovementioned heat cycle test. The results obtained are shown in Table 1. Furthermore, in regard to the presence/absence and extent of gas bubbles and cracks shown in the table, the symbols have the following meanings:

⊙: Absolutely no formation of gas bubbles or cracks.

○: Gas bubbles or cracks formed; size less than 10 mm.

Δ: Gas bubbles or cracks formed; size 10 mm or greater, but less than 30 mm.

×: Gas bubbles or cracks formed; size 30 mm or greater.

TABLE 1

| Components | | | Examples | | | | | | | Comparative Examples | | | |
|---|---|---|---|---|---|---|---|---|---|---|---|---|---|
| | | 1 | 2 | 3 | 4 | 5 | 6 | 7 | 1 | 2 | 3 | 4 |
| Composition (parts by weight) | a-1 | 43 | 37 | 50 | — | — | — | — | 100 | — | — | — |
| | a-2 | 7 | 13 | — | — | — | — | — | — | — | — | — |
| | a-3 | — | — | — | 60 | 70 | — | — | — | — | — | — |
| | a-4 | — | — | — | 15 | 5 | — | — | — | — | — | — |
| | a-5 | 50 | 50 | — | 25 | 25 | 50 | 100 | — | — | 50 | 100 |
| | a-6 | — | — | 50 | — | — | 50 | — | — | — | 50 | — |
| | a-7 | — | — | — | — | — | — | — | — | 100 | — | — |
| | b-1 | 7.3 | 7.8 | 12.3 | 11.7 | 14.1 | 7.0 | 4.6 | 6.7 | — | — | 2.0 |
| | b-2 | — | — | — | — | — | 0.2 | 0.1 | — | 05 | 1.7 | 0.6 |
| | c | 0.2 | 1.2 | 0.2 | 0.2 | 0.2 | 0.2 | 0.2 | 0.2 | 0.2 | 0.2 | 0.2 |
| SiH/SiCH=CH$_2$ | | | | | | | | | | | | | |
| 1/4 Consistency | | 71 | 49 | 99 | 55 | 37 | 53 | 85 | 90 | 80 | 52 | 43 |
| Loss of elastic modulus (Pa) | | $4.5 \times 10^2$ | $7.8 \times 10^2$ | $6.7 \times 10^2$ | $8.8 \times 10^2$ | $9.8 \times 10^2$ | $2.0 \times 10^2$ | $5.2 \times 10^2$ | $7.2 \times 10^1$ | $4.5 \times 10^1$ | $5.2 \times 10^1$ | $6.2 \times 10^1$ |
| Complex elastic modulus (Pa) | | $1.2 \times 10^3$ | $4.5 \times 10^3$ | $1.8 \times 10^2$ | $2.9 \times 10^3$ | $6.4 \times 10^3$ | $3.0 \times 10^3$ | $4.5 \times 10^2$ | $3.3 \times 10^2$ | $9.4 \times 10^2$ | $3.5 \times 10^3$ | $5.0 \times 10^3$ |
| Presence/absence and extent of gas bubbles/cracks | 1 cycles | ⊙ | ⊙ | ⊙ | ⊙ | ⊙ | ⊙ | ⊙ | x | x | x | Δ |
| | 5 cycles | ⊙ | ⊙ | ○ | ⊙ | ⊙ | ⊙ | ○ | x | x | x | x |
| Insulation breakdown strength | kV/mm | 20 | 19 | 20 | 19 | 20 | 17 | 18 | 2 | 1 | 1 | 3 |

The silicone gel composition of the present invention for use in the sealing and filling of electrical and electronic parts is characterized by the fact that the formation of gas bubbles and cracks in the silicone gel sealing or filling the above-mentioned electrical or electronic parts is suppressed. Furthermore, the silicone gel of the present invention seals or fills electrical or electronic parts, and is characterized by the fact that the formation of gas bubbles and cracks is suppressed.

What we claim is:

1. A silicone gel composition, comprising:

(A) an alkenyl group-containing organopolysiloxane which contains at least an alkenyl group-containing organopolysiloxane with a branched structure, and which has a viscosity of 10 to 100,000 centipoise at 25° C.;

(B) a linear organopolysiloxane which contains hydrogen atoms bonded to silicon atoms only at both ends of the molecular chains, and which has a viscosity of 1 to 10,000 centipoise at 25° C., the amount of this component that is mixed with the composition is such that the quantity of hydrogen atoms bonded to silicon atoms contained in this component is 0.2 to 5 moles per mole of alkenyl groups contained in component (A); and (C) a catalytic amount of a hydrosilylation reaction catalyst; wherein the composition cures to form a silicone gel having a loss elastic modulus of from $1.0 \times 10^2$ to $1.0 \times 10^4$ Pa at a temperature of 25° C. and a shear frequency of 0.1 Hz and a complex elastic modulus less than or equal to $1.0 \times 10^5$ Pa at a temperature of 25° C. and a shear frequency of 0.1 Hz.

2. The silicone gel composition claimed in claim 1, wherein the alkenyl group-containing organopolysiloxane is an alkenyl group-containing organopolysiloxane having a branched structure.

3. The silicone gel composition claimed in claim 1, wherein the alkenyl group-containing organopolysiloxane is a mixture comprising an alkenyl group-containing organopolysiloxane having a branched structure and a linear alkenyl group-containing organopolysiloxane.

4. The silicone gel composition as in claims 2 or 3, wherein the alkenyl group-containing organopolysiloxane having a branched structure comprises $R_2SiO_{2/2}$ units, $RSiO_{3/2}$ units, and $R_3SiO_{1/2}$ units; wherein R is a monovalent hydrocarbon group; and at least one R is alkenyl.

5. The silicone gel composition claimed in claim 4, wherein the alkenyl group-containing organopolysiloxane having a branched structure comprises from 80 to 99.6 mole % $R_2SiO_{2/2}$ units, from 0.1 to 10 mole % $RSiO_{3/2}$ units, and the remainder of the organopolysiloxane comprises $R_3SiO_{1/2}$ units.

6. The silicone gel composition claimed in claim 3, wherein the linear alkenyl group-containing organopolysiloxane has alkenyl groups at both ends of the molecular chain.

7. The silicone gel composition claimed in claim 3, wherein the alkenyl group-containing organopolysiloxane having a branched structure is present in an amount ranging from 5 to 95 weight percent of component (A).

8. The silicone gel composition claimed in claim 7, wherein the alkenyl group-containing organopolysiloxane having a branched structure is present in an amount ranging from 10 to 90 weight percent of component (A).

9. The silicone gel composition claimed in claim 8, wherein the alkenyl group-containing organopolysiloxane having a branched structure is present in an amount ranging from 20 to 80 weight percent of component (A).

10. The silicone composition claimed in claim 1, wherein the linear organopolysiloxane is present in an amount such that the quantity of hydrogen atoms bonded to silicon atoms in the linear oganopolysiloxane is from 0.8 to 1.2 moles per mole of alkenyl groups in component (A).

11. The silicone gel composition claimed in claim 1, wherein the hydrosilylation reaction catalyst is a platinum catalyst.

12. The silicone gel composition claimed in claim 11, wherein the platinum catalyst is present in sufficient quantity to provide from 0.01 to 1000 parts by weight platinum per one million parts of the composition.

13. The silicone gel composition claimed in claim 12, wherein the platinum catalyst is present in sufficient quantity to provide from 0.1 to 500 parts by weight platinum per one million parts of the composition.

14. A silicone gel composition, comprising:
- (A') an alkenyl group-containing organopolysiloxane which has a viscosity of 10 to 100,000 centipoise at 25° C.;
- (B') an organopolysiloxane which comprises a linear organopolysiloxane containing hydrogen atoms bonded to silicon atoms only at both ends of the molecular chains and a linear organopolysiloxane containing hydrogen atoms bonded to silicon atoms only on the molecular side chains, and which has a viscosity of 1 to 10,000 centipoise at 25° C., the amount of this component that is mixed with the composition is such that the quantity of hydrogen atoms bonded to silicon atoms contained in this component is 0.2 to 5 moles per mole of alkenyl groups contained in component (A'); and
- (C) a catalytic amount of a hydrosilylation reaction catalyst; wherein the composition cures to form a silicone gel having a loss elastic modulus of from $1.0 \times 10^2$ to $1.0 \times 10^4$ Pa at a temperature of 25° C. and a shear frequency of 0.1 Hz and a complex elastic modulus less than or equal to $1.0 \times 10^5$ Pa at a temperature of 25° C. and a shear frequency of 0.1 Hz.

15. The silicone gel composition claimed in claim 14, wherein the alkenyl groups in the alkenyl group-containing organopolysiloxane are vinyl groups.

16. The silicone gel composition claimed in claim 14, wherein the alkenyl group-containing organopolysiloxane has a linear structure.

17. The silicone gel composition claimed in claim 14, wherein the alkenyl group-containing organopolysiloxane has a branched structure.

18. The silicone gel composition claimed in claim 14, wherein the linear organopolysiloxane containing hydrogen atoms bonded to silicon atoms only on the molecular side chains is present in an amount ranging from 0.1 to 20% of the weight of the linear organopolysiloxane containing hydrogen atoms bonded to silicon atoms only at both ends of the molecular chains.

19. The silicone gel composition claimed in claim 18, wherein the linear organopolysiloxane containing hydrogen atoms bonded to silicon atoms only on the molecular side chains is present in an amount ranging from 1 to 10% of the weight of the linear organopolysiloxane containing hydrogen atoms bonded to silicon atoms only at both ends of the molecular chains.

20. The silicone gel composition claimed in claim 19, wherein the linear organopolysiloxane containing hydrogen atoms bonded to silicon atoms only on the molecular side chains is present in an amount ranging from 1 to 5% of the weight of the linear organopolysiloxane containing hydrogen atoms bonded to silicon atoms only at both ends of the molecular chains.

21. The silicone composition claimed in claim 14, wherein the organopolysiloxane (B') is present in an amount such that the quantity of hydrogen atoms bonded to silicon atoms is from 0.8 to 1.2 moles per mole of alkenyl groups in component (A').

22. The silicone gel composition claimed in claim 14, wherein the hydrosilylation reaction catalyst is a platinum catalyst.

23. The silicone gel composition claimed in claim 22, wherein the platinum catalyst is present in sufficient quantity to provide from 0.01 to 1000 parts by weight platinum per one million parts of the composition.

24. The silicone gel composition claimed in claim 23, wherein the platinum catalyst is present in sufficient quantity to provide from 0.01 to 500 parts by weight platinum per one million parts of the composition.

25. A silicone gel prepared by curing the silicone gel composition of claim 1.

26. A silicone gel prepared by curing the silicone gel composition of claim 18.

* * * * *